United States Patent [19]

Granere

[11] Patent Number: 5,435,168
[45] Date of Patent: Jul. 25, 1995

[54] TRANSDUCER TESTING SYSTEM FOR LOW FREQUENCY VIBRATIONS

[75] Inventor: Verne R. Granere, Romona, Calif.

[73] Assignee: Scientific-Atlanta, Inc., Norcross, Ga.

[21] Appl. No.: 107,012

[22] Filed: Aug. 17, 1993

[51] Int. Cl.[6] ........................... G01M 7/00; B06B 3/00
[52] U.S. Cl. ..................... 73/1 DV; 73/667; 73/663
[58] Field of Search ............ 73/1 DV, 667, 662, 663, 73/668, 579, 517 R

[56] References Cited

U.S. PATENT DOCUMENTS

| | | | |
|---|---|---|---|
| 2,301,967 | 11/1942 | Nosker et al. | 73/1 DV |
| 2,505,601 | 4/1950 | Bender, Jr. et al. | 73/1 DV |
| 2,971,364 | 2/1961 | Gatcombe | 73/1 DV |
| 2,974,536 | 3/1961 | Yorgiadis | 493/25 |
| 3,277,697 | 10/1966 | Wittkuhns | 73/667 |
| 4,482,859 | 11/1984 | Fournier | 73/579 |
| 4,495,433 | 1/1985 | Sheridan | 73/517 R |
| 4,783,998 | 11/1988 | Sander | 73/660 |
| 5,005,439 | 4/1991 | Jensen et al. | 73/667 |

OTHER PUBLICATIONS

*Operation and Maintenance Instructions for Rotor Analysis Diagnostic System—Advanced Technology (RAD-S-AT)*, Version 6.01—AVA, by Scientific-Atlanta, Inc., and Stewart Hughes, Ltd., 1990.

Laing, *Army Helicopter Vibration Survey Methods and Results*, 29th Annual Forum of the American Helicopter Society, Washington, D.C., May, 1973.

Houser et al., *Vibration Diagnostics in Helicopter Power Trains*, Paper 12 of NATO Advisory Group for Aerospace Research and Development (AGARD) Conference Proceedings No. 165 on Diagnostics and Engine Condition Monitoring, Apr. 1974.

*Primary Examiner*—Hezron E. Williams
*Assistant Examiner*—Rose M. Finley
*Attorney, Agent, or Firm*—Banner & Allegretti, Ltd.

[57] ABSTRACT

A transducer testing system for low frequency vibrations incorporates an electric motor/gearbox assembly 16 with an output shaft 18 and mechanical means for converting low frequency shaft rotation of the output shaft 18 to uniform low frequency sinusoidal excitation of an accelerometer 10. Simultaneously, a data processing unit 14 measures the response of the accelerometer 10 to the uniform low frequency excitation within predetermined frequency ranges. The data processing unit 14 then compares the measured response with predetermined accelerometer response limits to ascertain whether the accelerometer 10 is functional. The transducer testing system overcomes the limitations of electrodynamic testers to provide a means for accurately testing the low frequency response of the accelerometer 10.

48 Claims, 6 Drawing Sheets

5,435,168

TRANSDUCER TESTING SYSTEM FOR LOW FREQUENCY VIBRATIONS

BACKGROUND OF THE INVENTION

1. Technical Field

This invention relates to the field of testing transducers for transformation of mechanical energy to electrical energy such as accelerometers and velocity transducers, and more particularly to an apparatus and method for testing accelerometers and velocity transducers at low vibration frequencies.

2. Description of the Relevant Art

Accelerometers and velocity transducers are used generally to sense and provide an electrical output signal which may be utilized to measure aircraft frame vibration, and in particular to measure helicopter frame vibration that occurs when the main rotor blades of the helicopter are unbalanced and/or out of track. The accelerometer and the velocity transducer provide an electrical signal proportional to mechanical force exerted thereon at its location in the helicopter motive system.

Typically, accelerometers and velocity transducers are tested by exciting the transducer with an electrodynamic shaker that provides a sinusoidal excitation of the transducer at or near a reference frequency of 1000 Hertz, simultaneously measuring the response of the transducer to the reference excitations, and then comparing the measured response with predetermined limits to ascertain whether the transducer is functional. Optimally, the excitation of the transducer is perfectly sinusoidal so as not to introduce any harmonic excitations to the transducer under test. The electrodynamic shaker commonly includes a coil wrapped around an armature and produces sinusoidal excitation of the armature by varying the electromagnetic field surrounding the coil.

However, the performance of electrodynamic shakers suffers at low reference frequencies because the efficiency of the coil in transforming the varying electromagnetic field into sinusoidal motion of the armature is poor at low excitation frequencies. Because helicopter vibration problems commonly occur at low frequencies, there remains a need in the art to provide a transducer tester that verifies the accuracy of a transducer at such low frequencies.

SUMMARY OF THE INVENTION

The above-stated problems and related problems of the prior art are solved with the apparatus of the present invention, a transducer testing system for low frequency vibrations. In accordance with the invention, the transducer testing system comprises an electric motor/gearbox assembly with an output shaft and mechanical means for converting low frequency shaft rotation of the output shaft to uniform low frequency sinusoidal excitation of a transducer. Simultaneously, the transducer testing system measures the response of the transducer to the uniform low frequency excitation within predetermined frequency ranges. The measured response is then compared with predetermined transducer response limits to ascertain whether the transducer is functional.

The transducer testing system of the present invention overcomes the limitations of electrodynamic shakers to provide a means for accurately testing the low frequency response of an accelerometer and velocity transducer. The electric motor drives a piston through a gearbox assembly which provides an accurate low frequency source of predetermined vibrations to which the transducer under test is subjected.

For determining the speed of rotation of the motor, the transducer testing system may conveniently include a magnetic sensor, and an iron striker plate affixed to the output shaft of the electric motor/gearbox assembly with a size and shape such that the striker plate passes in close proximity to the magnetic sensor once during every rotation of the output shaft to provide a synchronization signal. The synchronization signal allows the testing system to selectively focus the frequency ranges sampled when measuring the response of the transducer to the low frequency excitation.

For effectuating known vibrations to the transducer under test, the transducer testing system according to the present invention further comprises an eccentric hub affixed to the output shaft of the motor/gearbox assembly, an annular bearing secured to one surface thereof and a piston, received within the confines of a piston bearing block, to which piston the accelerometer is fastened.

A transducer testing method according to the present invention further includes the steps of computing an average of the responses of the transducer during each cycle of the synchronization signal and subtracting the computed average from stored response data thereby eliminating the effects of noise such as the harmonic component of the output signal of the transducer under test.

These and other features of the present invention will become apparent to one of skill in the art from the following detailed description of a preferred embodiment.

DETAILED DESCRIPTION OF THE PREFERRED EMBODIMENTS

Figure 1:
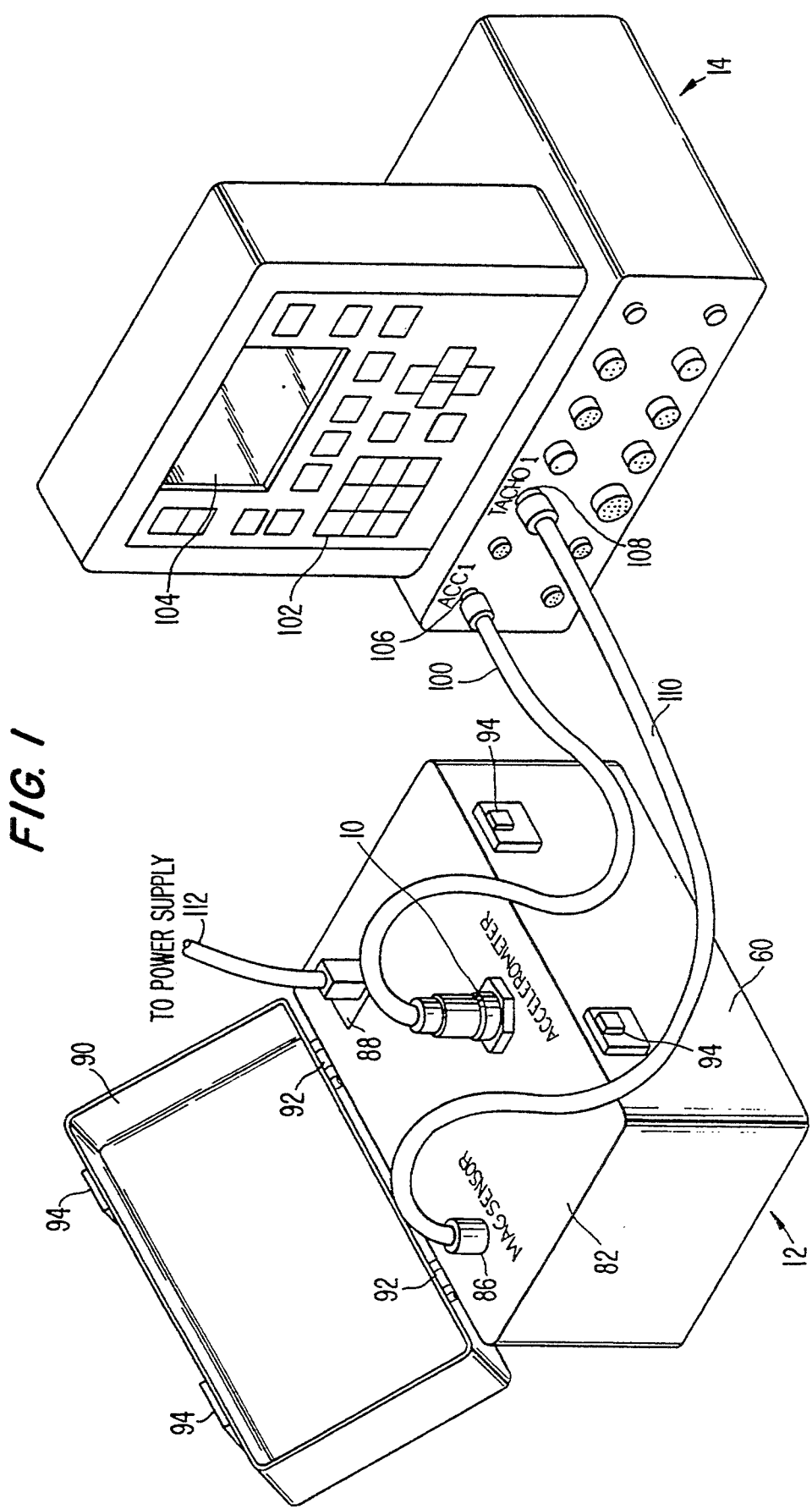
FIG. 1 is a diagrammatic representation of a transducer testing system in accordance with the present invention, showing an accelerometer under test, a portable vibrator, and a data processing unit.

Referring to FIG. 1, there is shown a diagrammatic representation of a transducer testing system which comprises an accelerometer 10 under test, a vibrator 12, and a data processing unit 14. Accelerometer 10 is more particularly described in connection with the following discussion of FIG. 2. The vibrator 12 applies a uniform low frequency excitation to the accelerometer 10. The vibrator 12 is most conveniently portable and mounted within the confines of the portable housing shown. The details of the vibrator 12 will be more fully explained in connection with the following discussion of FIGS. 3-6. Moreover, similar reference characters are utilized in each of FIGS. 1-6 to denote similar elements.

The data processing unit 14 simultaneously measures the response of the accelerometer 10 to the uniform low frequency excitation exerted by vibrator 12 within predetermined frequency ranges. The measured response is then compared with predetermined accelerometer response limits to ascertain whether the accelerometer 10 is functional. The operation of the data processing unit 14 will be more particularly described in connection with the discussion of FIGS. 7 and 8.

Figure 2:
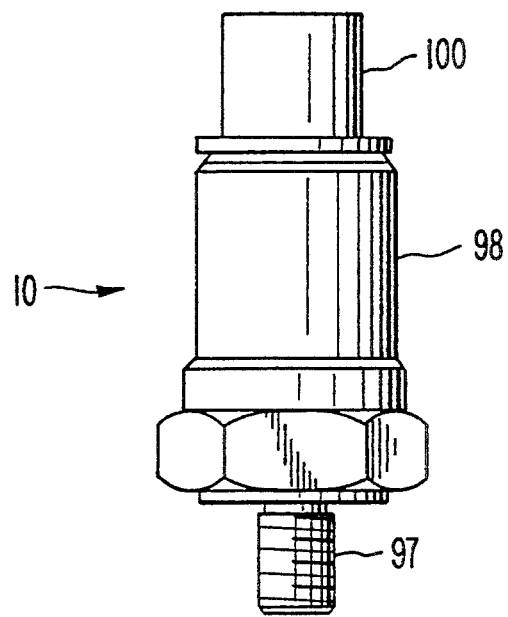
FIG. 2 is an elevational front view of a typical accelerometer.
Figure 3:
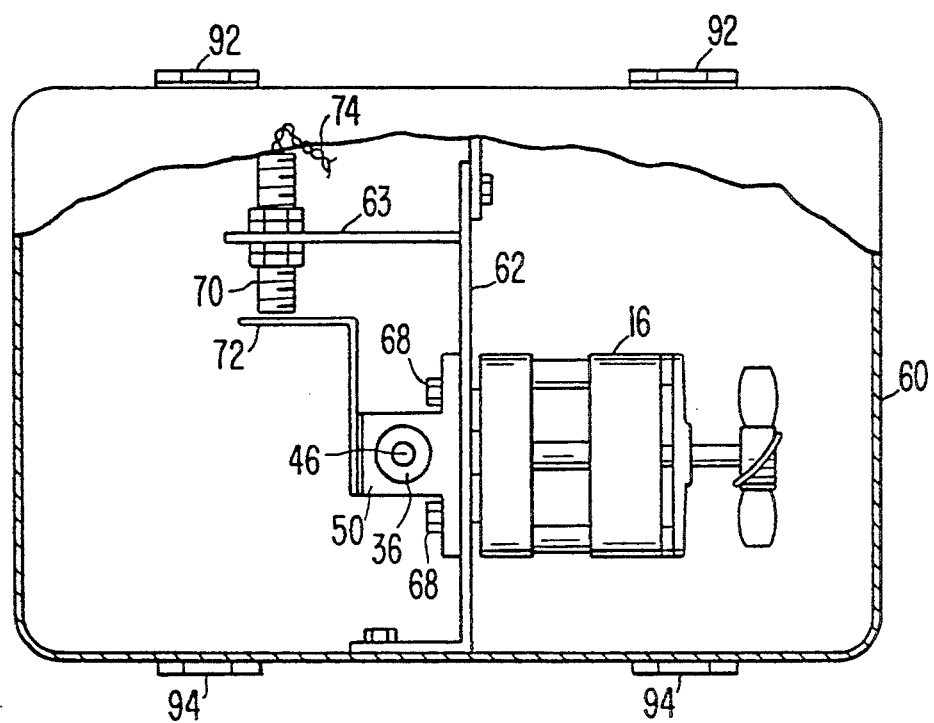
FIG. 3 is a top plan view of the portable vibrator in accordance with the present invention.

FIG. 2 shows an elevational view of the accelerometer 10 standing alone. An accelerometer is one example of a transducer for translating mechanical energy into an electrical output signal which is directly proportional to the mechanical energy to which it is subjected. The accelerometer is most conveniently provided with a screw fitting 97 by which it may be mounted to apparatus under stress. Electrical coupling means 98 is provided at an opposite end thereof to the screw fitting 97 to connect an output cable 100 that carries an output signal. The output signal has an electrical energy proportional to the mechanical energy to which the accelerometer 10 is subjected to.

Referring to FIGS. 3, 4, 5, and 6, the vibrator 12 comprises an electric motor/gearbox assembly 16 with an output shaft 18, an eccentric hub 20 eccentrically coupled to the output shaft 18, and an annular bearing 24 with an inner race 26 and an outer race 28. The electric motor/gearbox assembly 16 is a standard motor/gearbox assembly such as the RF 3715 gearmotor produced by Merkle-Korff of Des Plaines, Ill. A screw 30, integral to a tapped bore 32 through the eccentric hub 20, is screwed tightly against a flattened portion 34 of the output shaft 18 to secure the eccentric hub 20 to the output shaft 18. The inner race 26 of the bearing 24 is press fit to a first cylindrical surface 22 of the eccentric hub 20.

The vibrator 12 further comprises a piston 36 having a second cylindrical surface 38, first and second end surfaces 40 and 42, a notch 44 in the first end surface 40 that engages the outer race 28 of the bearing 24, a tapped hole 46 in the second end surface 42, and a groove 48 in the second cylindrical surface 38. The accelerometer 10 (not shown) is screwed into and removed from the tapped hole 46. A piston bearing block 50 is affixed to motor/gearbox assembly 16 and has an inner sleeve 52 which slidably mates to the second cylindrical surface 38 to guide a sliding motion of the piston 36 in the vertical direction. The piston 36 is biased to outer race 28 of the bearing 24 by a spring 54 that surrounds the second cylindrical surface 38. The spring 54 is mounted between the piston bearing block 50 and a spring clip 56 that fits securely into the groove 48.

The vibrator 12 is enclosed in a housing 60. A mounting flange 62 is securely fastened to the housing 60. The electric motor/gearbox assembly 16 is affixed to the mounting flange 62 by screws 64. The piston block 50 is affixed to the mounting flange 62 by threaded posts 66 and bolts 68. The vibrator 12 may further comprise a magnetic sensor 70, and an iron striker plate 72 affixed to the output shaft 18 with a size and shape such that the striker plate 72 passes within close proximity of the magnetic sensor 70 once during every rotation of the output shaft 18 to provide a synchronization signal 74.

The magnetic sensor 70 has a threaded third cylindrical surface 76 that passes through a cutout 78 in a support arm 63 of the mounting flange 62. The magnetic sensor 70 is adjustably affixed to the support arm 63 by lock nuts 80 situated on opposite sides of the support arm 63. The spacing between the magnetic sensor 70 and the outward are of rotation of the striker plate 72 is adjusted to be within 0.1 inches.

Figure 4:
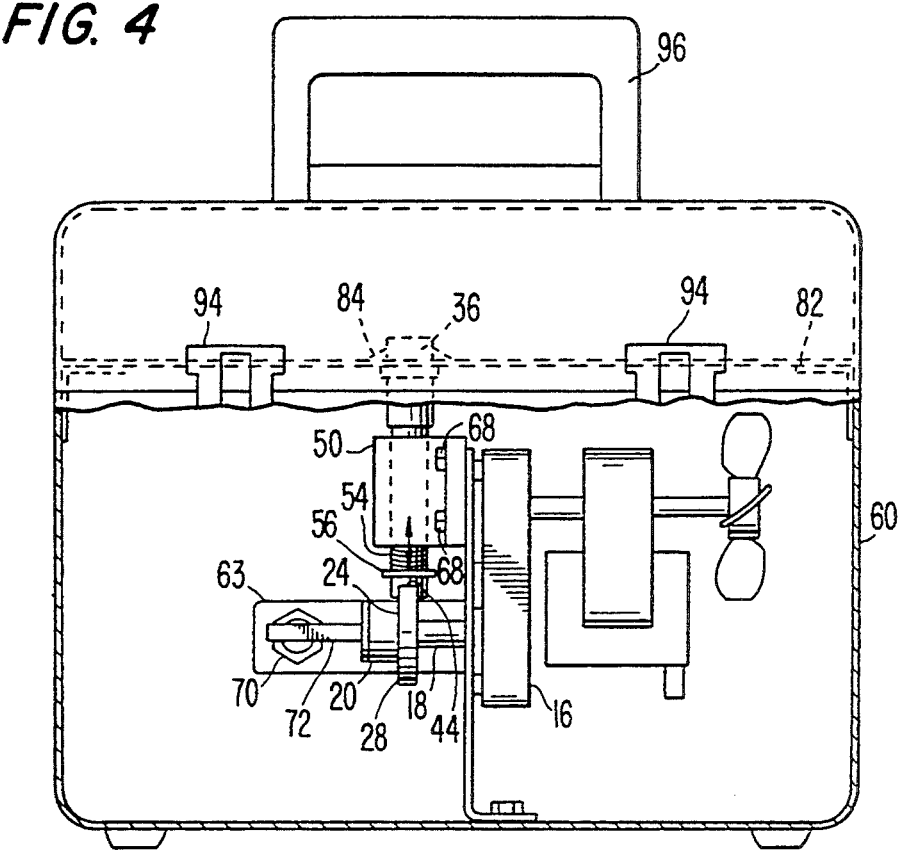
FIG. 4 is a front elevational view of the portable vibrator in accordance with the present invention.
Figure 5:
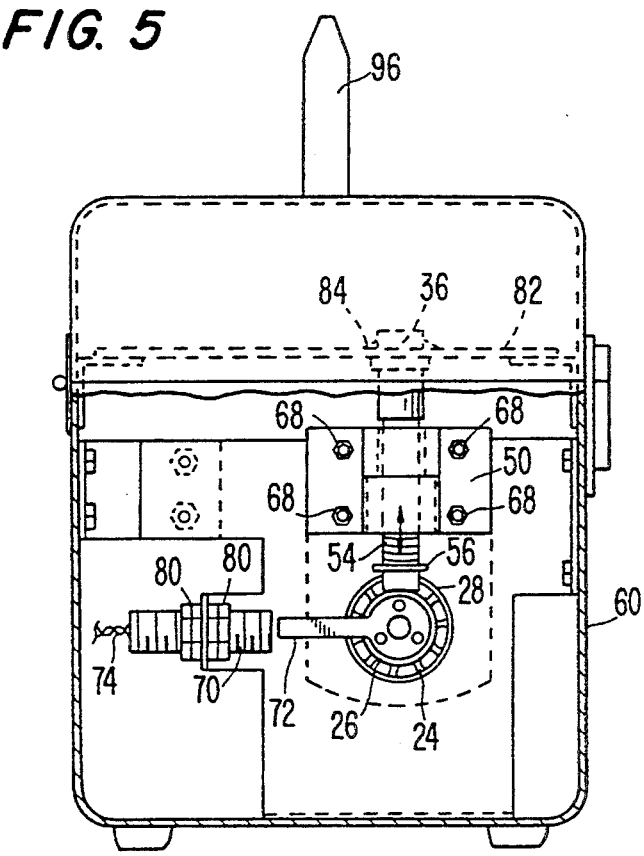
FIG. 5 is a side elevational view of the portable vibrator in accordance with the present invention.
Figure 6:
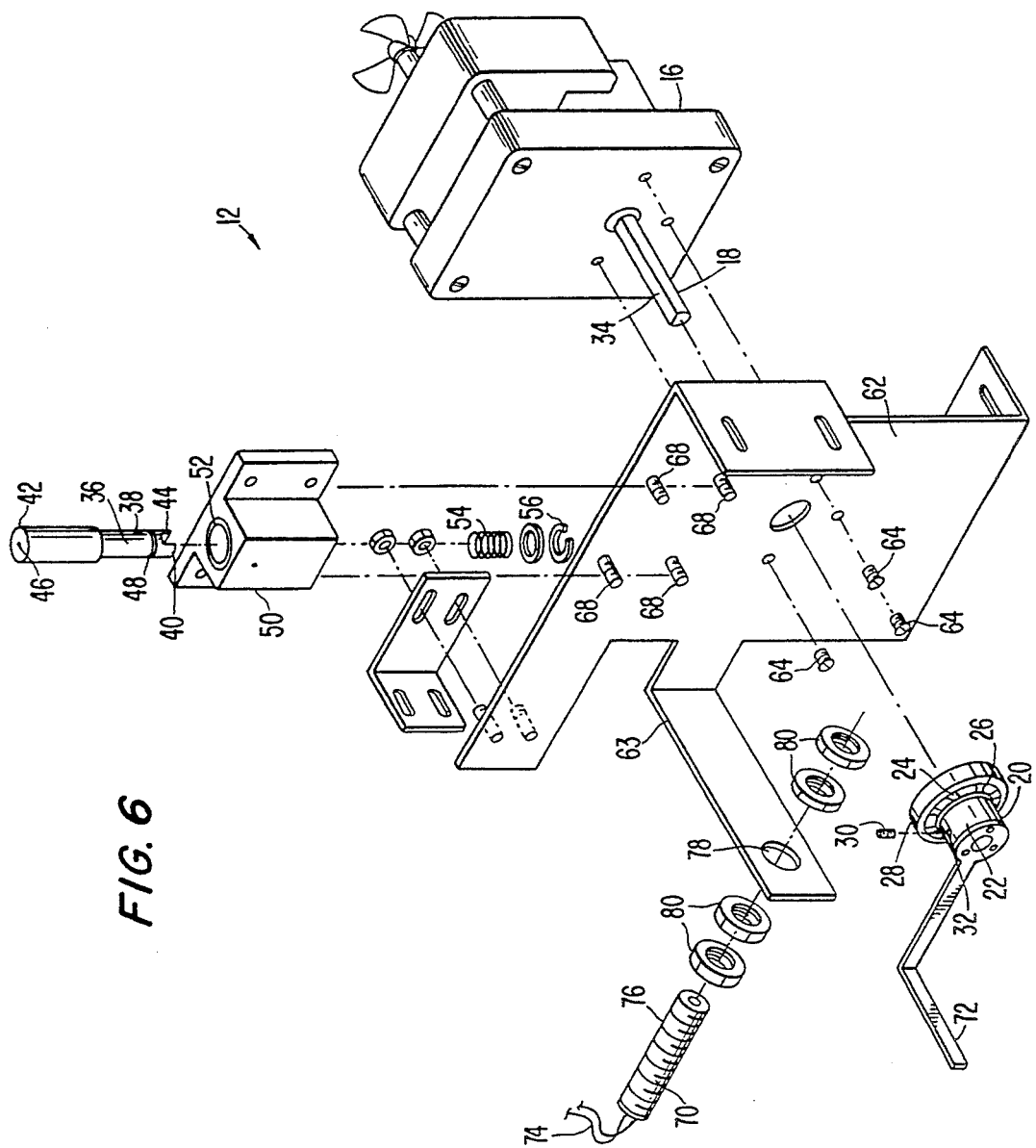
FIG. 6 is an exploded view of the portable vibrator in accordance with the present invention.

Referring to FIGS. 1, 4 and 5, the housing has a top surface 82 with a beveled opening 84 that allows the piston 36 to protrude therefrom. A first mating connector 86 and a second mating connector/switch 88 are also integral to the top surface 82. The first mating connector is electrically coupled to the synchronization signal 74. The second mating connector/switch 88 is connected to the power inputs of the electric motor/gearbox assembly 16. A hinged top 90 is removably coupled to the housing 60 by hinges 92 and latches 94. To make the vibrator portable, the top has a carrying handle 96.

When power is supplied to the electric motor/gearbox assembly 16, the output shaft 18 rotates causing the eccentric hub 20 to produce a sinusoidal motion. The inner race 26 of the bearing 24, press fit to the eccentric hub 20, rotates sinusoidally with the eccentric hub 20. The outer race 28 of the bearing 24, however, remains rotationally stationary with respect to the piston 36 but moves vertically. The piston 36, kept in contact with the outer race 28 by the piston bearing block 50, the spring 54, and spring clip 56, follows the vertical motion of the outer race 28 to produce a uniform low frequency sinusoidal excitation of the accelerometer 10. The accelerometer 10 provides an output signal with an electric energy proportional to the mechanical force exerted thereon due to the excitation.

Referring to FIG. 1, the data processing unit 14 has a keypad 102, a display screen 104, a first input connector 106 connected to the output cable 100 of the accelerometer 10, and a second input connector 108. The data processing unit 14 can be any system that incorporates signal processing hardware and a microprocessor based input/output system adapted for control according to the subsequent discussions of FIGS. 7 and 8. A suitable system is the Rotor Analysis and Diagnostic System—Advanced Technology, hereinafter the RADSAT system, a menu driven signal processing system produced by Scientific-Atlanta, Inc, Instrumentation Group, of San Diego, Calif. When using the RADS-AT test system, the output cable 100 of the accelerometer 10 is connected to the input connector 106 labeled "ACC 1." Simultaneous to the excitation of the accelerometer 10, the data processing unit 14 reads the output signal of the accelerometer 10. The data processing unit 14 analyzes the output signal of the accelerometer, preferably by first converting the analog output signal into digital form, and then performing Fast Fourier Transforms to the digital form of the output signal within a set of predetermined frequency ranges. The data processing unit then integrates the transformed digital output, converting the transformed output from units of acceleration into units of velocity. The data processing unit then displays the transformed output signal at the display 64. The user or the data processing unit 14 then compares the analyzed output with predetermined accelerometer response limits to ascertain whether the accelerometer 10 is functional.

Optionally, the synchronization signal 74 can be coupled to the data processing unit 14 by connecting a second cable 110 between the first mating connector 86 and the input connector 106. When utilizing the RADS-AT test system, the second cable 110 connects the first mating connector 86 to the input connector 106 labeled "TACHO 1". The synchronization signal 74 allows the data processing unit 14 to selectively focus the frequency ranges sampled when performing the Fast Fourier Transforms to the digitized form of the output signal of the accelerometer 10.

The sinusoidal excitation of the accelerometer 10 by the vibrator 12 can be represented by the formula $X_d = A_0 \sin(\omega^* t)$, where $X_d$ is the displacement of the accelerometer in inches, $A_0$ is the amplitude of excitation in inches, $\omega$ is the angular velocity of the excitation in radians per second, and t is time in seconds. The excitation angular velocity, $\omega$, corresponds to the frequency of rotation of the output shaft in RPMs according to the formula, $\omega = 2*\Pi*RPM/60$). If a single speed motor/gearbox assembly is used, the excitation frequency of the accelerometer is fixed at the frequency of the output shaft of the motor/gearbox assembly. If a variable speed motor/gearbox assembly is used, the excitation frequency can vary over the range of output shaft frequencies supplied by the motor/gearbox assembly. The amplitude of excitation, $A_0$, is fixed by the displacement of the eccentric hub from the axis of rotation of the output shaft.

Yet, the data processing unit 14 does not transform the output signal of the accelerometer 10 into units of displacement, but into units of velocity in inches per second. Therefore, when comparing the output of the data processing unit 14 with predetermined accelerometer response limits to ascertain the functionality of the accelerometer 10, the limits in units of inches per second are calculated according to the following formula: velocity of excitation = the derivative of the displacement, $|dX_d/dt| = A_0*\omega$. For example, if the vibrator utilizes an eccentric hub displaced 0.04 inches from the axis of rotation of the output shaft (i.e. $A_0 = 0.04$ inches) and an electric motor/gearbox assembly operating at a fixed frequency of 230 RPMs (i.e. the angular velocity $\omega = 2*\Pi*230/60 = 24.1$ radians per second), the vibrator provides an excitation according to the formula, $X_d = 0.04 \sin(24.08*t)$ where $X_d$ is in inches and t is seconds. The expected excitation velocity is then calculated to be $A_0*\omega = 0.04*24.08 = 0.96$ inches per second. Acceptable variations around the expected velocity of 0.96 inches per second are then determined to produce the accelerometer response limits used as a benchmark against the output of the data processing unit 14 as shown below in Table A.

Methods for operating the transducer testing system are provided below. The low frequency excitation of the accelerometer 10 is made to correspond to a frequency of rotation of a helicopter rotor under normal operating conditions, typically within a range from 192 to 288 revolutions per minute. The methods below describe in detail the accelerometer testing system utilizing a Merkle-Korff RF 3715 gearmotor with the output shaft 18 operating at or near a fixed frequency of 230 revolutions per minute, the eccentric hub 20 displaced 0.04 inches from the output shaft 18, and the Scientific Atlanta RADS-AT test system as the data processing unit 14. The method steps can be modified for different applications or when a suitable alternative to the RADS-AT test system is used.

Figure 7:
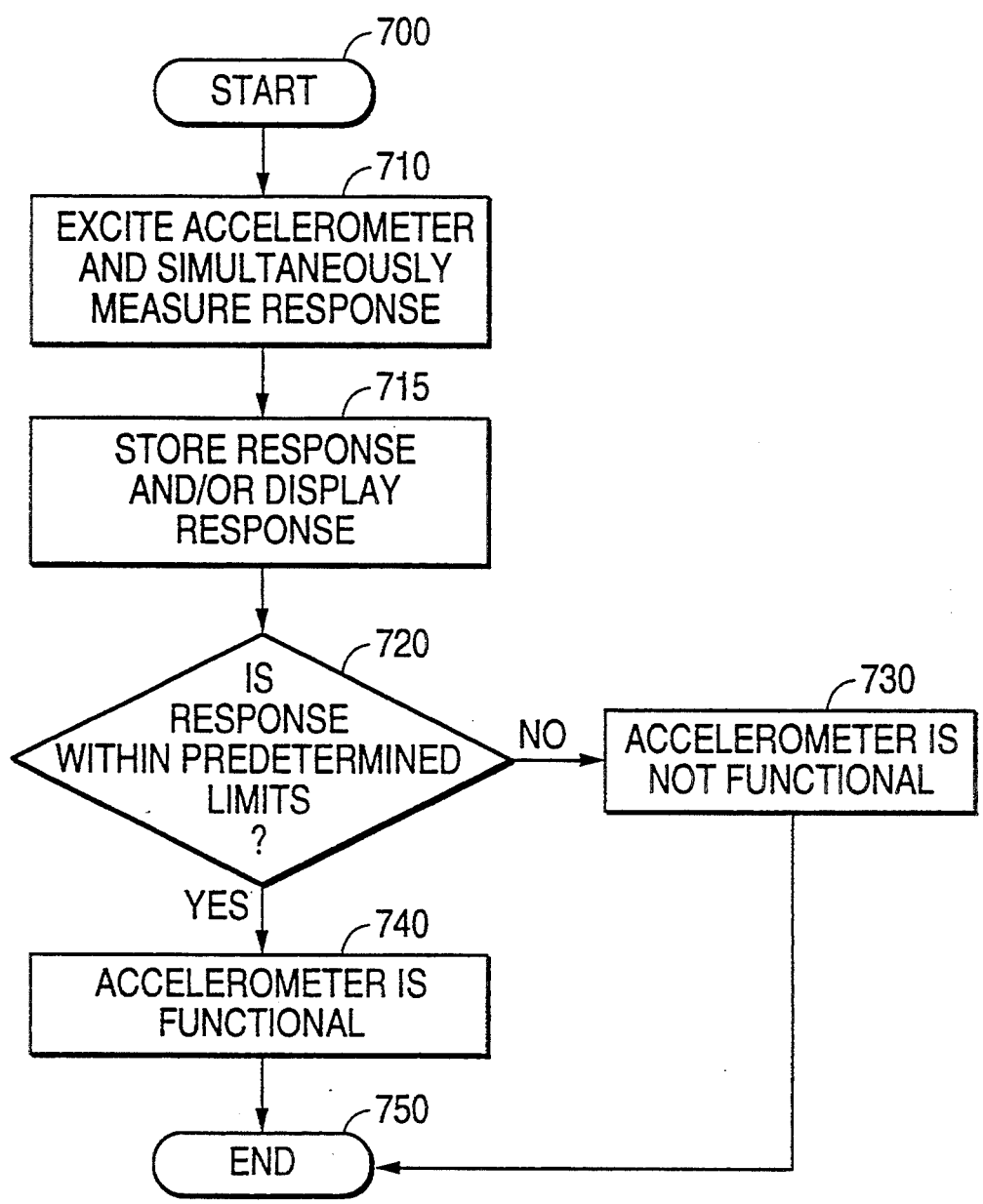
FIG. 7 is a flow chart of a first method for operating a transducer tester in accordance with the present invention.

Referring to FIG. 7, a method for operating the accelerometer testing system for low frequency vibrations is presented. In the start box 700, the accelerometer testing system is setup as shown in FIG. 1. The output cable 100 of the accelerometer 10 is connected to the "ACC 1" input connector 106 of the RADS-AT test system. Power is supplied to RADS-AT test system. The aircraft type "ACCTST" is selected by using the touch keypad 102. The accelerometer serial number is entered using the touch keypad 102. "Test" is selected for the flight plan using the touch keypad 102.

In box 710, power is supplied to the vibrator 12 by connecting a power supply cable 112 to the second mating connector/switch 88 and turning the connector/switch 88 into an "ON" position. Turning on the power activates the vibrator, thereby providing the accelerometer with a uniform low frequency sinusoidal excitation. "MEASURE" is then selected using the touch keypad 102. "DO" is selected two times to permit the system to simultaneously measure the response of the system to the low frequency sinusoidal excitation. When measuring the response of the accelerometer 10, the RADS-AT system first converts the analog integrated output signal of the accelerometer 10 into digital form, and then performs Fast Fourier Transforms of the digital form of the output signal within a set of predetermined frequency ranges. The RADS-AT system then integrates the transformed digital output, converting the transformed output from units of acceleration into units of velocity. In Box 715, "DO" is selected on a "FINISH" prompt and then selected again on a "MAIN MENU" prompt. "F2" is selected and then "DO" is selected on the "ONE TEST STATE" prompt to display the response of the accelerometer 10 in units of velocity (inches per second) within the predetermined frequency ranges.

TABLE A

| Output Shaft Frequency Range (RPM) between | | Acceptable Accelerometer Response (Inches/Second) between | |
|---|---|---|---|
| 200 | 202.5 | 0.794 | 0.934 |
| 202.5 | 207.5 | 0.824 | 0.958 |
| 207.5 | 212.5 | 0.844 | 0.981 |
| 212.5 | 217.5 | 0.864 | 1.004 |
| 217.5 | 222.5 | 0.884 | 1.028 |
| 222.5 | 227.5 | 0.905 | 1.051 |
| 227.5 | 232.5 | 0.925 | 1.075 |
| 232.5 | 237.5 | 0.945 | 1.098 |
| 237.5 | 242.5 | 0.965 | 1.121 |
| 242.5 | 247.5 | 0.985 | 1.145 |

In decision box 720, having determined the frequency of the output shaft 18, the user compares the displayed response of the accelerometer to the acceptable accelerometer response indicated in Table A for the given output shaft frequency. If the displayed response is not within the accelerometer response limits displayed in TABLE A, in box 730 the accelerometer 10 is determined to be non-functional. If the displayed response is within the accelerometer response limits displayed in TABLE A, in box 740 the accelerometer 10 is determined to be functional. After the determination is made, in box 750 power is removed from the system and the system disconnected to end the test.

Figure 8:
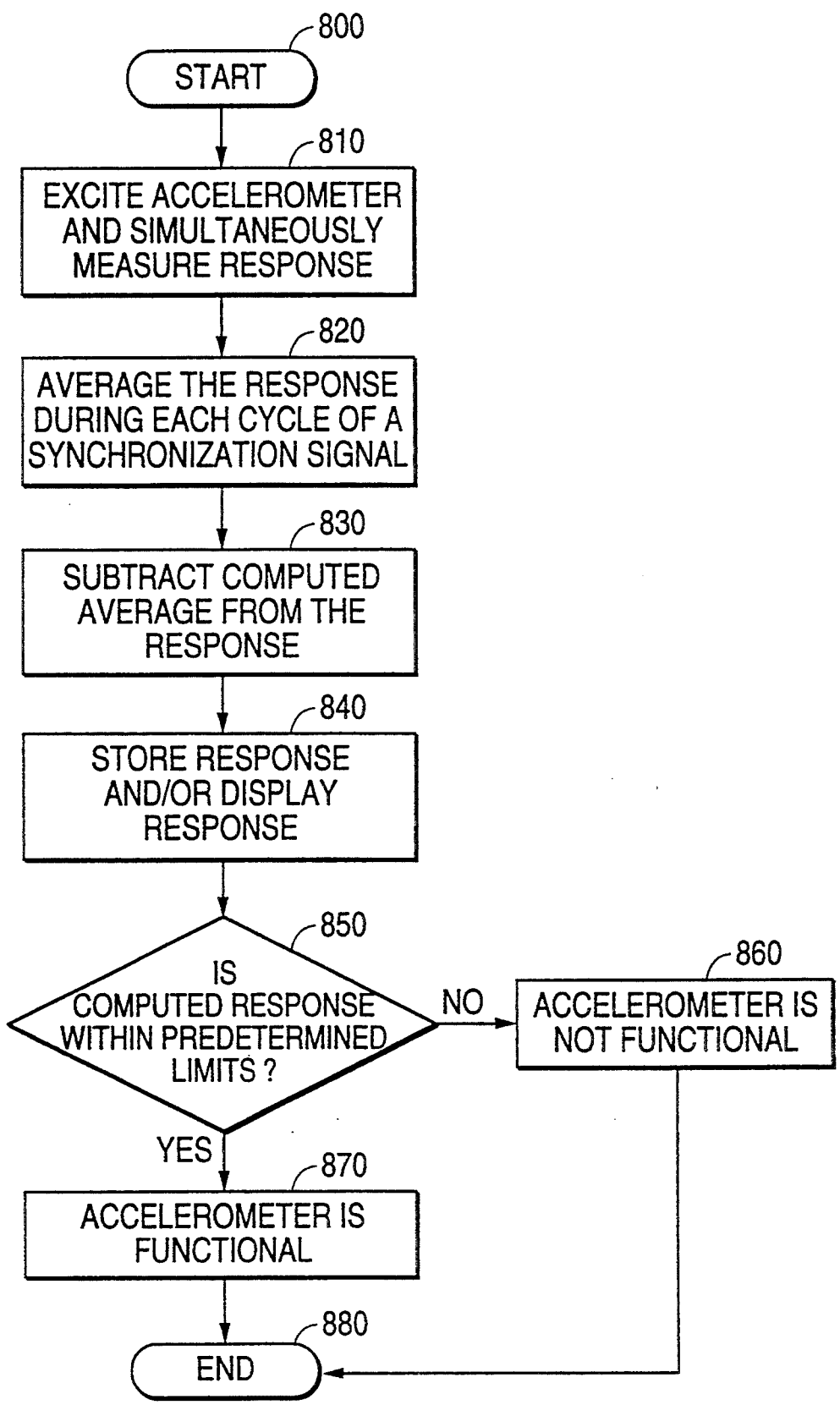
FIG. 8 is a flow chart of a second method for operating a transducer tester in accordance with the present invention.

Referring to FIG. 8, when the accelerometer testing system includes the magnetic sensor 70 and the iron striker plate 72 to produce the synchronization signal 74, a method for operating the testing system comprises the following steps. In the start box 800, the accelerometer testing system is setup as shown in FIG. 1. The output cable 100 of the accelerometer 10 is connected to the "ACC 1" input 106 of the RADS-AT test system. The synchronization signal 74 is coupled to the RADS-AT system by connecting the second cable 110 between the first connector 86 and the "TACHO 1" input connector 108. Power is supplied to RADS-AT test system. The aircraft type "ACCTST" is selected by using the touch keypad 102. The accelerometer serial number is entered using the touch keypad 102. "Test" is selected for the flight plan using the touch keypad 102.

In Box 810, power is supplied to the vibrator 12 by connecting a power supply cable 112 to the second mating connector/switch 88 and turning the connector/switch 88 into an "ON" position. Turning on the power activates the vibrator, thereby providing the accelerometer with a uniform low frequency sinusoidal excitation. "MEASURE" is then selected using the touch keypad 102. "DO" is selected two times to permit the system to simultaneously measure the response of the system to the low frequency sinusoidal excitation. When measuring the response of the accelerometer 10, the RADS-AT system first converts the analog integrated output signal of the accelerometer 10 into digital form, and then performs Fast Fourier Transforms of the digital form of the output signal within a set of predetermined frequency ranges. The RADS-AT system selects the predetermined frequency ranges dependent upon the frequency of the synchronization signal 74. The RADS-AT system then integrates the transformed digital output, converting the transformed output from units of acceleration into units of velocity.

The RADS-AT system then has the option to perform the operations in boxes 820 and 830. In box 820, the RADS-AT system averages the transformed output during each cycle of the synchronization signal 74 within the predetermined frequency ranges. In Box 830 the RADS-AT system subtracts the computed average from the transformed output within the predetermined frequency ranges. This step eliminates harmonic components from the transformed output of the accelerometer 10.

In Box 840, "DO" is selected on a "FINISH" prompt and then selected again on a "MAIN MENU" prompt. "F2" is selected, "DO" is selected on the "ONE TEST STATE" prompt, and then "DO" is selected on "CH1 ASYNCH" prompt to display the computed response of the accelerometer 10 in inches per second within the predetermined frequency ranges and the frequency of the output shaft 18.

In decision box 850, the user compares the displayed response of the accelerometer 10 to the acceptable accelerometer response indicated in Table A at the displayed output shaft frequency. If the displayed response is not within the accelerometer response limits displayed in TABLE A, in box 860 the accelerometer 10 is determined to be non-functional. If the displayed response is within the accelerometer response limits displayed in TABLE A, in box 870 the accelerometer 10 is determined to be functional. After the determination is made, in box 880 power is removed from the system and the system disconnected to end the test.

The embodiments of the present invention as described above disclose the operation of the transducer testing system in testing the functionality of an accelerometer. The present invention can also be used to test the functionality of velocity transducers. The vibrator 12 applies a uniform low frequency excitation to a velocity transducer. The data processing unit 14 simultaneously analyzes the response of the velocity transducer to the uniform low frequency excitation exerted by vibrator 12 by first converting the analog output signal of the velocity transducer into digital form, and then performing Fast Fourier Transforms to the digital form of the output within a set of predetermined frequency ranges. Unlike the testing of accelerometers, when testing velocity transducers the transformed output of the transducer is not integrated. The transformed response is compared with predetermined transducer response limits to ascertain whether the velocity transducer is functional. Although the invention has been shown and described with respect to a particular embodiment thereof, it should be understood by those skilled in the art that the foregoing and various other changes, omissions, and additions in the form and detail thereof may be made therein without departing from the spirit and scope of the invention.

What is claimed is:

1. A transducer testing system having vibrating means for vibrating a transducer that translates mechanical energy to electrical energy and measuring means for measuring a response of said transducer within predetermined frequency ranges, wherein the improvement is characterized by:

said vibrating means having an electric motor, a first output shaft, and mechanical converting means for converting low frequency shaft rotation of said first output shaft to a uniform low frequency sinusoidal excitation of said transducer;

said vibrating means further having a gearbox that converts shaft rotation of a second shaft of said electric motor at a first frequency to shaft rotation of said first output shaft at a second frequency; and said transducer testing system further comprising synchronization means for providing a synchronization signal at a third frequency that corresponds to said second frequency of said first output shaft, wherein said measuring means is responsive to said synchronization signal.

2. A transducer testing system as recited in claim 1 further characterized in that said mechanical converting means includes an eccentric hub affixed to said first output shaft, said eccentric hub having an outer first cylindrical surface;

an annular bearing having an inner race and an outer race, said inner race secured to said first cylindrical surface;

a piston having a second cylindrical surface, first and second end surfaces, biasing means for biasing said first end surface to said outer race of said annular bearing, and means for fastening said transducer to said second end surface in alignment with a sliding motion of said piston; and a piston bearing block having an inner sleeve which slidably mates to said second cylindrical surface to guide said sliding motion of said piston.

3. A transducer testing system as recited in claim 2 further characterized in that said piston includes a notch in said first end surface that engages said outer race of said bearing, and said biasing means includes a spring clip that fits securely in a groove in said second cylindrical surface, and a spring surrounding said second cylindrical surface mounted between said spring clip and said piston bearing block to bias said notch to said outer race of said annular bearing.

4. A transducer testing system as recited in claim 1 further comprising synchronization means for providing a synchronization signal at said frequency of excitation of said transducer provided by said vibrating means.

5. A transducer testing system as recited in claim 4 further characterized in that said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

6. A transducer testing system as recited in claim 1 further characterized in that said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

7. The transducer testing system as recited in claim 1 further characterized in that said low frequency of said sinusoidal excitation of said transducer corresponds to a frequency of rotation of a helicopter rotor under normal operating conditions.

8. The transducer testing system as recited in claim 7 further characterized in that said frequency of rotation of a helicopter rotor is within a range from 192 to 288 revolutions per minute.

9. A transducer testing system having vibrating means for vibrating a transducer that translates mechanical energy to electrical energy and measuring means for measuring a response of said transducer within predetermined frequency ranges, wherein the improvement is characterized by:
 said vibrating means having an electric motor, a first output shaft, and mechanical converting means for converting low frequency shaft rotation of said first output shaft to a uniform low frequency sinusoidal excitation of said transducer;
 said mechanical converting means including
  an eccentric hub affixed to said first output shaft, said eccentric hub having an outer first cylindrical surface;
  an annular beating having an inner race and an outer race, said inner race secured to said first cylindrical surface;
  a piston having a second cylindrical surface, first and second end surfaces, biasing means for biasing said first end surface to said outer race of said annular bearing, and means for fastening said transducer to said second end surface in alignment with a sliding motion of said piston; and
  a piston beating block having an inner sleeve which slidably mates to said second cylindrical surface to guide said sliding motion of said piston.

10. A transducer testing system as recited in claim 9 further characterized in that said piston includes a notch in said first end surface that engages said outer race of said bearing, and said biasing means includes a spring clip that fits securely in a groove in said second cylindrical surface, and a spring surrounding said second cylindrical surface mounted between said spring clip and said piston bearing block to bias said notch to said outer race of said annular bearing.

11. A transducer testing system comprising:
 an electric motor and gearbox assembly with an output shaft;
 an eccentric hub affixed to said output shaft, said eccentric hub having an outer first cylindrical surface;
 an annular bearing having an inner race and an outer race, said inner race secured to said first cylindrical surface;
 a piston having a second cylindrical surface, first and second end surfaces, a notch in said first end surface that engages said outer race of said bearing, a spring clip that fits securely in a groove in said second cylindrical surface, a spring surrounding said second cylindrical surface mounted between said spring clip and said piston bearing block to bias said notch to said outer race of said annular bearing, and means for fastening said transducer to said second end surface in alignment with a sliding motion of said piston;
 a piston bearing block having an inner sleeve which slidably mates to said second cylindrical surface of said piston to guide said sliding motion of said piston and vibrate said transducer; and
 measuring means for measuring a response of said transducer to said vibration within predetermined frequency ranges, said measuring means having first circuit means for performing Fast Fourier Transforms to the response of said transducer.

12. The transducer testing system as recited in claim 11 wherein said transducer is an accelerometer and said measuring means has second circuit means for integrating the response of said accelerometer.

13. The transducer testing system as recited in claim 11 wherein said transducer is a velocity transducer.

14. A transducer testing system as recited in claim 11 further comprising a magnetic sensor, a member affixed to said output shaft and formed from iron or a suitable magnetic material with a size and shape such that said member passes in close proximity to said magnetic sensor once during every rotation of said output shaft to provide a synchronization signal, and said predetermined frequency ranges of said measuring means being dependent upon said synchronization signal.

15. The transducer testing system as recited in claim 14 further comprising comparing means for comparing the response of said transducer with predetermined limits.

16. The transducer testing system as recited in claim 11 further comprising comparing means for comparing the response of said transducer with predetermined limits.

17. A vibrator for exciting a transducer that translates mechanical energy to electrical energy at a uniform low frequency sinusoidal excitation, the vibrator comprising:
 an electric motor;
 a first output shaft; and
 mechanical converting means for converting low frequency shaft rotation of said first output shaft to a uniform low frequency sinusoidal excitation of said transducer, wherein mechanical convening means comprises
  an eccentric hub affixed to said first output shaft, said eccentric hub having an outer first cylindrical surface,
  an annular beating having an inner race and an outer race, said inner race secured to said first cylindrical surface,
  a piston having a second cylindrical surface, first and second end surfaces, biasing means for biasing said first end surface to said outer race of said annular bearing, and means for fastening said transducer to said second end surface in alignment with a sliding motion of said piston, and a piston bearing block having an inner sleeve which slidably mates to said second cylindrical surface to guide said sliding motion of said piston.

18. A vibrator as recited in claim 17 further comprising a gearbox that converts shaft rotation of a second shaft of said electric motor at a first frequency to shaft rotation of said first output shaft at a second frequency.

19. The vibrator as recited in claim 18 wherein said biasing means includes a notch in said first end surface that engages said outer race of said bearing, a spring clip that fits securely in a groove in said second cylindrical surface, and a spring surrounding said second cylindrical surface mounted between said spring clip and said piston bearing block to bias said notch to said outer race of said annular bearing.

20. The vibrator as recited in claim 18 further comprising a synchronization means for providing a synchronization signal at a third frequency that corresponds to said second frequency of said output shaft.

21. The vibrator as recited in claim 20 wherein said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

22. The vibrator as recited in claim 18 wherein said low frequency of said sinusoidal excitation of said transducer corresponds to a frequency of rotation of a helicopter rotor under normal operating conditions.

23. The vibrator as recited in claim 22 wherein said frequency of rotation of a helicopter rotor is within a range from 192 to 288 revolutions per minute.

24. The vibrator as recited in claim 17 wherein said biasing means includes a notch in said first end surface that engages said outer race of said bearing, a spring clip that fits securely in a groove in said second cylindrical surface, and a spring surrounding said second cylindrical surface mounted between said spring clip and said piston bearing block to bias said notch to said outer race of said annular bearing.

25. The vibrator as recited in claim 17 further comprising a synchronization means for providing a synchronization signal at said frequency of excitation of said transducer provided by said converting means.

26. The vibrator as recited in claim 25 wherein said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

27. The vibrator as recited in claim 17 wherein said low frequency of said sinusoidal excitation of said transducer corresponds to a frequency of rotation of a helicopter rotor under normal operating conditions.

28. The vibrator as recited in claim 27 wherein said frequency of rotation of a helicopter rotor is within a range from 192 to 288 revolutions per minute.

29. A vibrator for exciting a transducer that translates mechanical energy to electrical energy at a uniform low frequency sinusoidal excitation, the vibrator comprising:

a housing;

an electric motor and gearbox assembly with an output shaft;

a mounting means secured to said housing for affixing said motor and gearbox assembly to said housing;

an eccentric hub affixed to said output shaft, said eccentric hub having an outer first cylindrical surface;

an annular bearing having an inner race and an outer race, said inner race secured to said first cylindrical surface;

a piston having a second cylindrical surface, first and second end surfaces, a notch in said first end surface that engages said outer race of said bearing, a spring clip that fits securely in a groove in said second cylindrical surface, a spring surrounding said second cylindrical surface mounted between said spring clip and said piston bearing block to bias said notch to said outer race of said annular bearing, and means for fastening said transducer to said second end surface in alignment with a sliding motion of said piston; and a piston bearing block having an inner sleeve which slidably mates to said second cylindrical surface of said piston to guide said sliding motion of said piston and vibrate said transducer, said piston bearing block affixed to said mounting means.

30. The vibrator as recited in claim 29 wherein said housing has a hinged top having a carrying handle coupled to said hinged top and a top surface with a beveled opening that allows said piston to protrude therefrom and a first mating connector/switch connected to the power inputs of the electric motor/gearbox assembly integral to said top surface.

31. The vibrator as recited in claim 29 wherein said housing has a top surface with a beveled opening that allows said piston to protrude therefrom and a hinged top that covers said top surface, said piston slidably oscillating in a vertical direction perpendicular to said top surface of said housing.

32. A vibrator as recited in claim 29 further comprising a magnetic sensor affixed to said mounting means, and a member affixed to said output shaft and formed from iron or a suitable magnetic material with a size and shape such that said member passes in close proximity to said magnetic sensor once during every rotation of said output shaft to provide a synchronization signal, said magnetic sensor having an adjusting means for adjusting the spacing between said magnetic sensor and said member.

33. A method of operating a transducer tester, said transducer tester having vibrating means for sinusoidally exciting a transducer that translates mechanical energy to electrical energy, said transducer tester also having measuring means for measuring and storing a response of said transducer within predetermined frequency ranges, said vibrating means having an electric motor, a first output shaft, and mechanical converting means for converting low frequency shaft rotation of said first output shaft to a uniform low frequency sinusoidal excitation of said transducer, said transducer tester further having comparing means for comparing the response of said transducer with predetermined limits, the method comprising the steps of:

sinusoidally exciting said transducer at a low frequency with said vibrating means;

simultaneously measuring and storing the response of said transducer to said excitation within said predetermined frequency ranges with said measuring means; and comparing the response of said transducer with said predetermined limits in order to ascertain whether said transducer is functional.

34. The method of operating a transducer tester as recited in claim 33 wherein said low frequency of excitation of said transducer corresponds to a frequency of rotation of a helicopter rotor under normal operating conditions.

35. The method of operating a transducer tester as recited in claim 34 wherein said frequency of rotation of a helicopter rotor is within a range from 192 to 288 revolutions per minute.

36. A method of operating a transducer tester, said transducer tester having vibrating means for sinusoidally exciting a transducer that translates mechanical energy to electrical energy, said transducer tester also having measuring means for measuring and storing a response of said transducer within predetermined frequency ranges, said vibrating means having an electric motor, a first output shaft, mechanical converting means for converting low frequency shaft rotation of said first output shaft to a uniform low first frequency sinusoidal excitation of said transducer, and a synchronization means for providing a synchronization signal at a second frequency that corresponds to said first frequency, said transducer tester further having comparing means for comparing the response of said transducer with predetermined limits, the method comprising the steps of:

sinusoidally exciting said transducer at said first frequency and producing said synchronization signal at said second frequency with said vibrating means;

simultaneously measuring and storing the response of said transducer to said excitation within said predetermined frequency ranges with said measuring means, said predetermined frequency ranges dependent upon said second frequency of said synchronization signal; and comparing the response of said transducer with said predetermined limits in order to ascertain whether said transducer is functional.

37. The method of operating a transducer tester as recited in claim 36 wherein said low frequency of excitation of said transducer corresponds to a frequency of rotation of a helicopter rotor under normal operating conditions.

38. The method of operating a transducer tester as recited in claim 37 wherein said frequency of rotation of a helicopter rotor is within a range from 192 to 288 revolutions per minute.

39. A method of operating a transducer tester, said transducer tester having vibrating means for sinusoidally exciting a transducer that translates mechanical energy to electrical energy, said transducer tester also having measuring means for measuring and storing a response of said transducer within predetermined frequency ranges, said vibrating means having an electric motor, a first output shaft, mechanical converting means for converting low frequency shaft rotation of said first output shaft to a uniform low first frequency sinusoidal excitation of said transducer, and a synchronization means for providing a synchronization signal at a second frequency that corresponds to said first frequency, said transducer tester further having a means for computing an average of the response of said transducer during each cycle of said synchronization signal and subtracting said computed average from each stored response, the method comprising the steps of:

sinusoidally exciting said transducer at said first frequency and producing said synchronization signal at said second frequency with said vibrating means;

simultaneously measuring and storing the response of said transducer to said excitation within said predetermined frequency ranges with said measuring means, said predetermined frequency ranges dependent .upon said second frequency of said synchronization signal; and computing said average of the response of said transducer during each cycle of said synchronization signal and then subtracting said computed average from each stored response in order to eliminate harmonic components from the response of said transducer.

40. A method of operating a transducer tester as recited in claim 39, said transducer tester having comparing means for comparing the response of said transducer with predetermined limits, the method having an additional step of comparing the response of said transducer with said predetermined limits in order to ascertain whether said transducer is functional.

41. A transducer tester comprising vibrating means for sinusoidally exciting a transducer that translates mechanical energy to electrical energy, said vibrating means having an electric motor, a first output shaft, and mechanical converting means for converting low frequency shaft rotation of said first output shaft to a uniform low frequency sinusoidal excitation of said transducer;

measuring means for measuring and storing a response of said transducer within predetermined frequency ranges; and comparing means for comparing the response of said transducer with predetermined limits to thereby ascertain whether said transducer is functional.

42. The transducer tester of claim 41 further comprising a synchronization means for providing a synchronization signal at the frequency of excitation of said transducer produced by said vibrating means.

43. The transducer tester of claim 42 wherein said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

44. The transducer tester of claim 41 wherein said vibrating means further has a gearbox that converts shaft rotation of a second shaft of said electric motor at a first frequency to shaft rotation of said first output shaft at a second frequency.

45. The transducer tester of claim 44 further comprising a synchronization means for providing a synchronization signal at a third frequency that corresponds to said second frequency of said first output shaft, and wherein said measuring means is responsive to said synchronization signal.

46. The transducer tester of claim 45 wherein said synchronization means includes a magnetic sensor, and a member affixed to said first output shaft formed from iron or a suitable magnetic material with a size and shape such that said member passes in close proximity to said magnetic sensor once during every rotation of said first output shaft to provide said synchronization signal.

47. The transducer tester of claim 41 wherein said mechanical converting means includes an eccentric hub affixed to said first output shaft, said eccentric hub having an outer first cylindrical surface;

an annular bearing having an inner race and an outer race, said inner race secured to said first cylindrical surface;

a piston having a second cylindrical surface, first and second end surfaces, biasing means for biasing said first end surface to said outer race of said annular bearing, and means for fastening said transducer to said second end surface in alignment with a sliding motion of said piston; and a piston beating block having an inner sleeve which slidably mates to said second cylindrical surface to guide said sliding motion of said piston.

48. The transducer tester of claim 47 wherein said piston includes a notch in said first end surface that engages said outer race of said bearing, wherein said biasing means includes a spring clip that fits securely in a groove in said second cylindrical surface, and wherein a spring surrounding said second cylindrical surface is mounted between said spring clip and said piston bearing block to bias said notch to said outer race of said annular beating.

* * * * *

UNITED STATES PATENT AND TRADEMARK OFFICE
CERTIFICATE OF CORRECTION

PATENT NO. : 5,435,168
DATED : July 25, 1995
INVENTOR(S) : Verne R. GRANERE

It is certified that error appears in the above-indentified patent and that said Letters Patent is hereby corrected as shown below:

Column 8, line 68, cancel beginning with "4. A transducer testing system" to and including "means." in column 9, line 3, and insert the following claim:
  4. A transducer testing system as recited in claim 1 wherein said synchronization signal represents said frequency of excitation of said transducer provided by said vibrating means
Column 10, line 64, delete "beating" and insert ––bearing––.

Signed and Sealed this

Twenty-eighth Day of November 1995

Attest:

BRUCE LEHMAN

*Attesting Officer*      *Commissioner of Patents and Trademarks*